Figure 10:
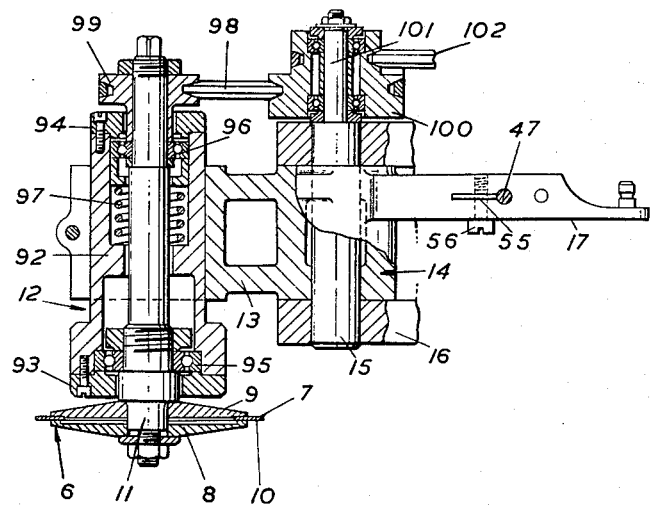

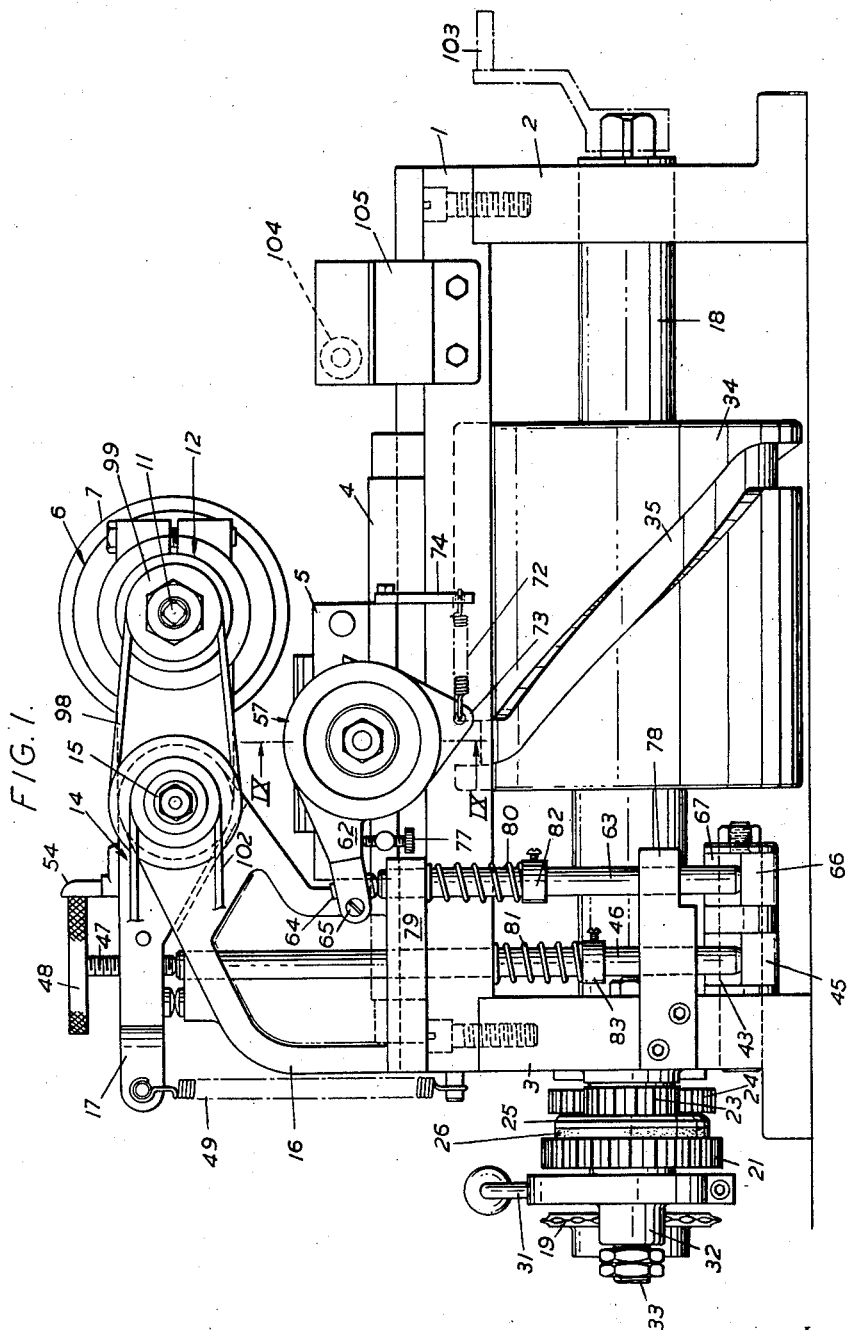

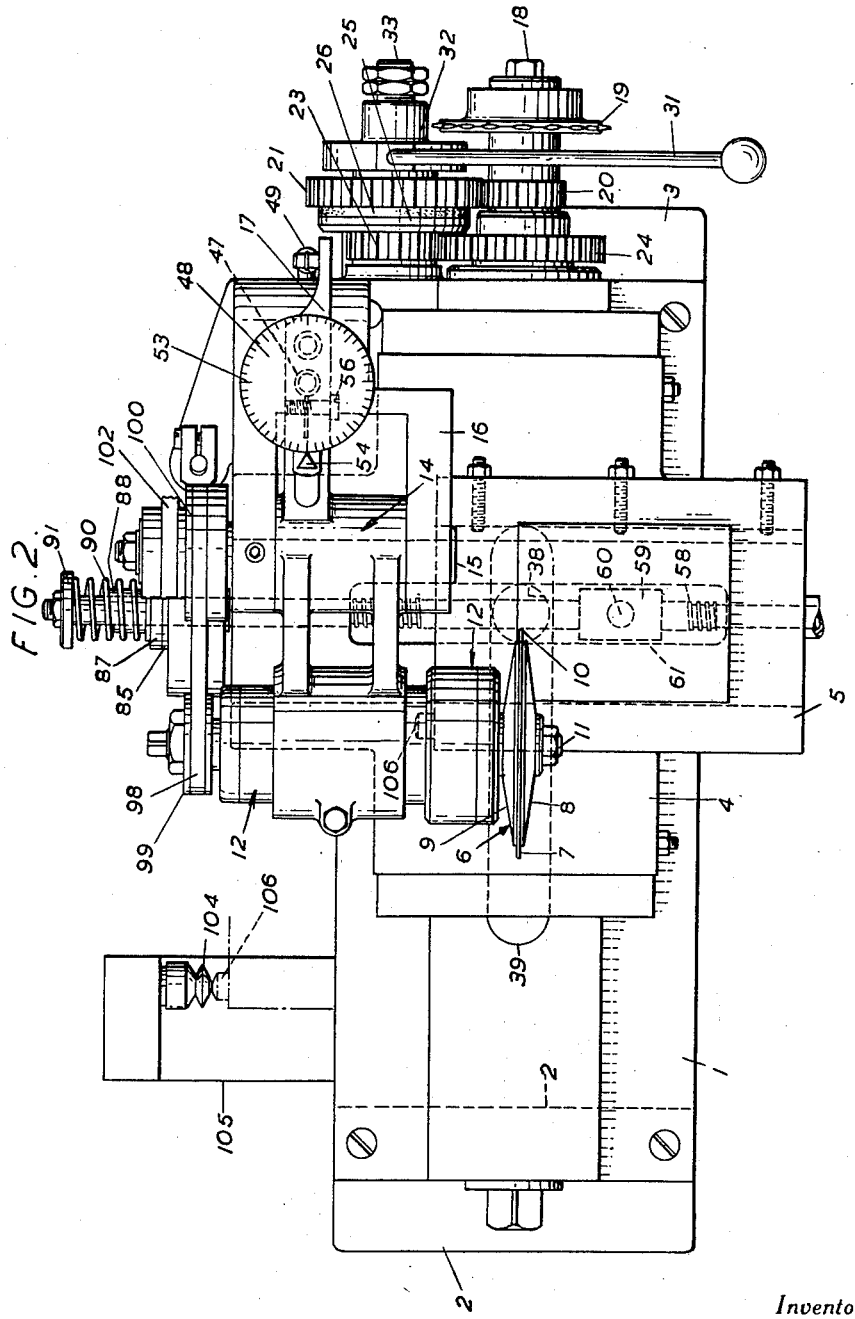

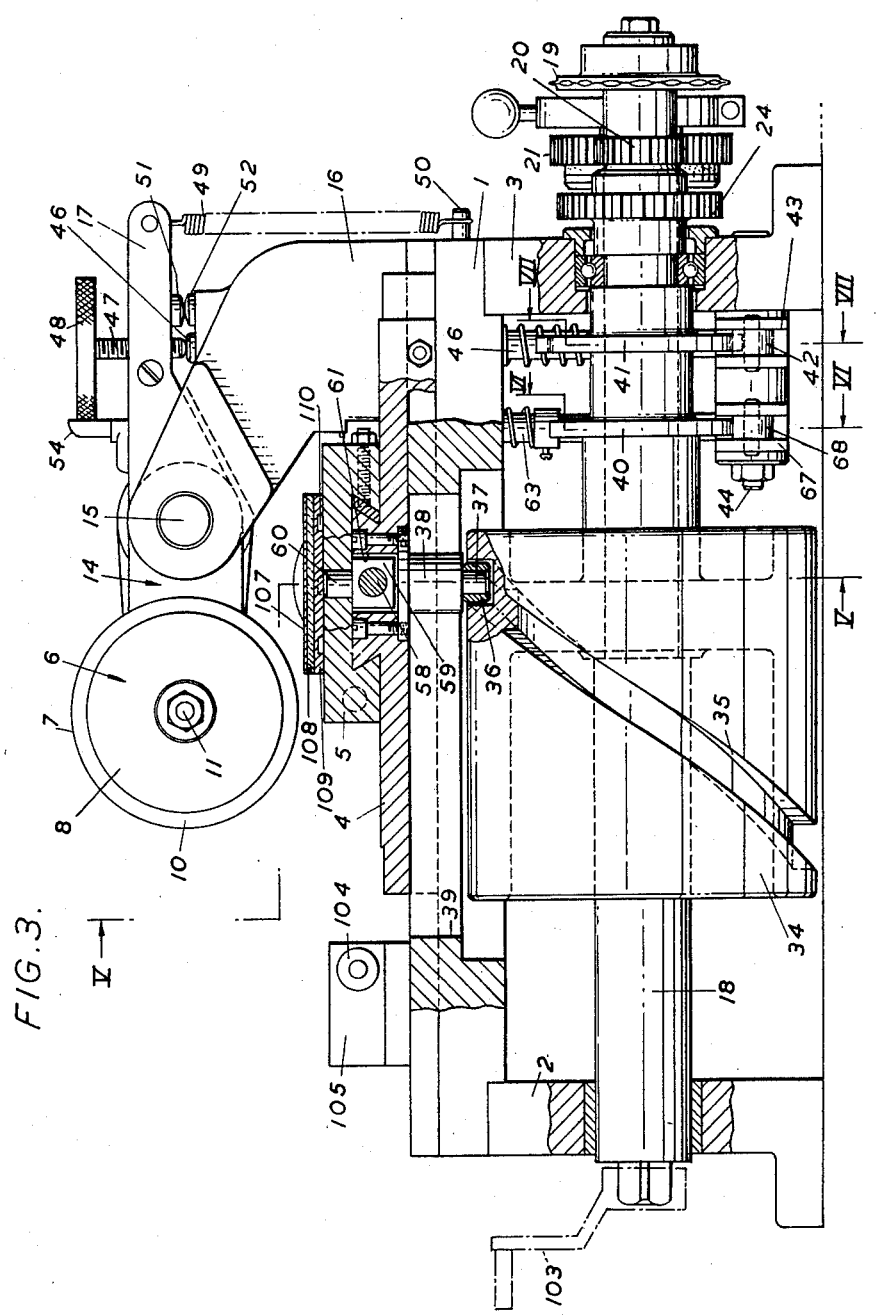

Sept. 20, 1955     P. N. GLENDINING     2,718,098
MACHINES FOR CUTTING SHEET MATERIAL
Filed Dec. 3, 1953     6 Sheets-Sheet 4
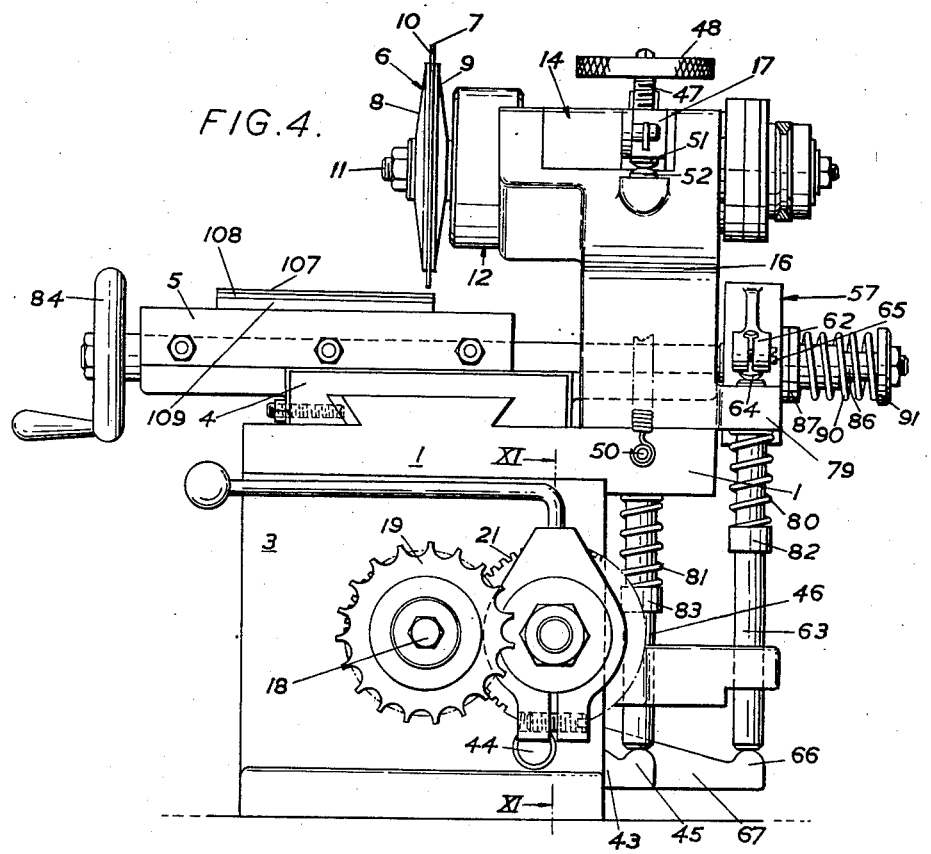
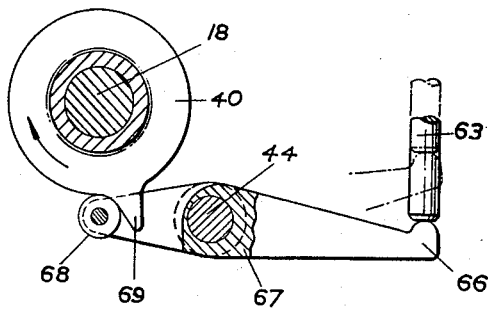
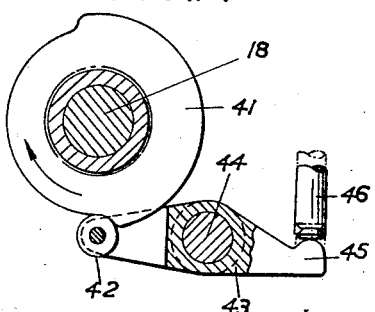
Inventor
PHILLIP NORMAN GLENDINING.
By Ward, Crosby + Neal
Attorneys.

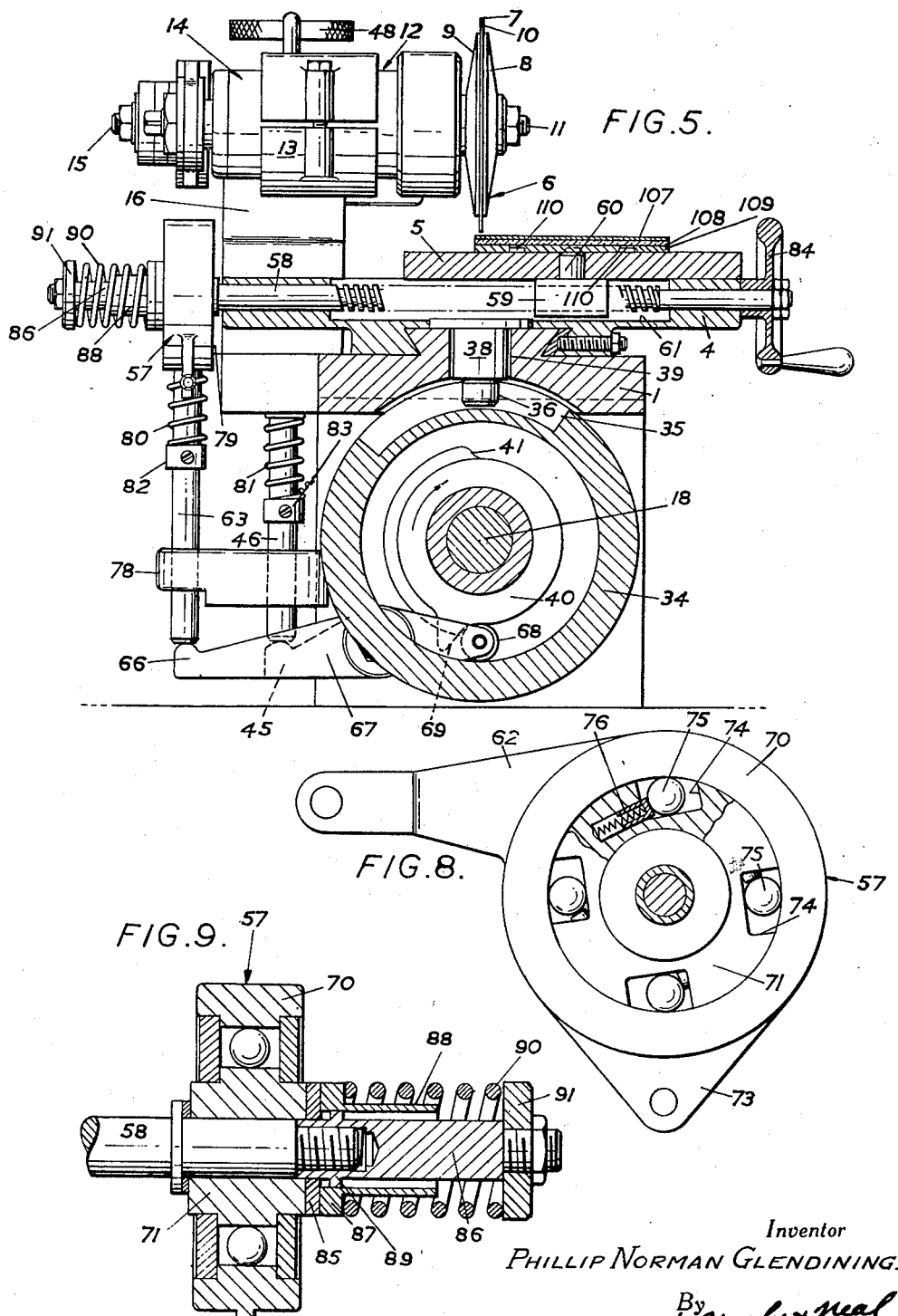

Inventor
PHILLIP NORMAN GLENDINING.

United States Patent Office 2,718,098
Patented Sept. 20, 1955

2,718,098
MACHINES FOR CUTTING SHEET MATERIAL

Phillip Norman Glendining, Downend, Bristol, England

Application December 3, 1953, Serial No. 395,959

Claims priority, application Great Britain
December 5, 1952

13 Claims. (Cl. 51—92)

This invention concerns a new or improved machine for cutting sheets, slabs, or like bodies of material, especially material of a relatively hard character, into small pieces or slices, and has especial, but not exclusive, reference to a machine for use in producing crystals for use in electronic apparatus, e. g., crystal diodes, triodes and the like, by cutting up or dicing sheets of, for example, germanium into small rectangular pieces.

Hitherto the cutting or dicing of sheets, slabs, or like bodies (all hereinafter referred to as "sheets") of germanium or like hard material into small pieces has been a difficult, tedious, inaccurate and uneconomic process and it is an object of this invention to provide a machine which is particularly suitable for carrying out this work (and especially for producing germanium crystals) satisfactorily and economically.

According to the invention there is provided a machine for cutting sheets of hard material into smaller, e. g. square or rectangular, pieces, such machine comprising a work slide for supporting the sheet to be cut; a cutting wheel adjacent to the said work slide; a main slide carrying said work slide and reciprocable in the direction of the plane of said cutting wheel; a drum located with its axis parallel with the direction of reciprocation of said main slide; a peripheral cam track on said drum; a follower on said main slide co-operating with said cam track to reciprocate said main slide upon rotation of said drum; cam means for cyclically advancing said cutting wheel towards said work slide at the commencement of alternate strokes of said main slide and for withdrawing said cutting wheel at the termination of each such stroke; and means for indexing said work slide relatively to said main slide and in a direction parallel with the axis of the said cutting wheel and whilst the latter is withdrawn from said work slide whereby, once the machine is started, the said sheet is automatically cut in one direction successively along a series of parallel lines to produce a series of strips of the material.

To cut the said strips transversely into small pieces, e. g. rectangles or squares, the said sheet is turned, e. g. through 90°, in its own plane with respect to the axis of the cutting wheel and is then re-cut by the wheel in the same way as before.

For the cutting operation the germanium or like sheet to be worked upon is preferably secured by a suitable adhesive such as shellac or pitch, to a glass or other carrier sheet so that although the germanium sheet is first cut through into strips and later into smaller pieces these strips and pieces are firmly held by the glass or like backing (which is not cut by the cutting wheel), the small pieces thus formed subsequently being removed from the backing sheet.

Figure 11:
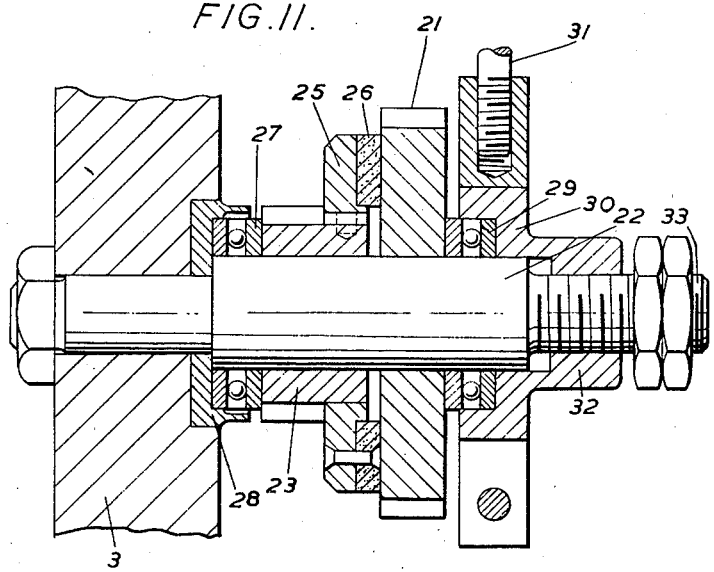

In order that the invention may be more readily understood one embodiment of the same as applied to a machine for cutting rectangular sheets of germanium into small pieces, and particularly rectangular or square pieces, will now be described, by way of example, with reference to the accompanying drawings, in which:

Figure 1 is a side elevation of the machine;
Figure 2 is a plan of the machine shown in Figure 1;
Figure 3 is a part side elevation and part longitudinal vertical section of the machine;
Figure 4 is a rear elevation of the machine as seen from the right hand of Figure 2;
Figure 5 is a section on line V—V, Figure 3;
Figure 6 is a section on line VI—VI, Figure 3;
Figure 7 is a section on line VII—VII, Figure 3;
Figure 8 is a fragmentary sectional side elevation, drawn to an enlarged scale, of the one-way drive mechanism of the machine;
Figure 9 is a vertical section on line IX—IX Figure 1, drawn to an enlarged scale, and shows further parts of the said one-way drive mechanism;
Figure 10 is a part sectional plan of the cutting head of the machine; and
Figure 11 is a vertical sectional view on line XI—XI Figure 4, drawn to an enlarged scale, and shows details of the main clutch of the machine.

The machine illustrated comprises a main slide bed 1 arranged in a horizontal plane upon parallel front and rear pillars 2 and 3 which support the main slide bed 1 at a sufficiently elevated level to enable certain mechanism to be arranged below the slide bed as hereinafter described.

A main slide 4 is mounted on the main slide bed for guided reciprocation between the front and back of the machine, i. e. between the said pillars 2 and 3, and on this main slide is mounted a work slide 5 which is capable of guided adjustment on the main slide 4 in a direction at right angles to the direction of traverse of the main slide.

Above the main slide 4 is arranged a cutting wheel 6 located in a vertical plane and having its axis parallel to the main slide bed and extending in a direction perpendicular to the direction of traverse of the main slide.

The cutting wheel 6 is preferably in the form of a metal ring 7 (see Figure 10 particularly) having hard cutting, e. g. diamond, particles embedded in its end faces, the said ring being coaxially gripped between a pair of clamping plates 8 and 9 so as to leave a peripheral marginal portion 10 of the ring exposed, and said clamping plates being removably fixed upon one end of a cutting wheel spindle 11. The spindle 11 forms part of a cutting wheen unit 12 which is removably mounted in one end of one arm 13 of a cutting head 14 in the form of a two-armed lever pivoted between its ends upon a horizontal cutting head pivot spindle 15; the latter is carried at the upper bifurcated end of a horn or arm 16 fixed to and projecting upwardly from, and inwardly over, the main slide bed 1, the said pivot spindle 15 being parallel to the cutting wheel spindle 11 and the second arm 17 of the cutting head 14 being adapted to control the movement of the cutting wheel to and from the work, all as will hereinafter be explained.

It will, of course, be understood that the cutting wheel is located in such a position over the work slide 5 that the latter can be traversed with the main slide 1 from front to back (in a direction at right angles to the axis of the cutting wheel spindle 11) below the cutting wheel as well as being capable, as hereinafter explained, of movement alone in the general direction of or parallel to the axis of said cutting wheel spindle.

Between the two pillars 2 and 3, supporting the main slide bed 1, is arranged a horizontal cam shaft 18 which is journalled near its ends in the said pillars of the machine. The cam shaft 18 is driven through the medium of a main sprocket wheel 19 mounted for free rotation on the rear end of the shaft, this sprocket being driven by an electric motor or other suitable means (not shown) either directly or through reduction gears, a change speed gear box, or the like and rigidly carrying a spur (or equivalent gear) wheel 20 which meshes (see Figure 2 for example) with a larger spur wheel 21 mounted in a freely rotatable manner (see Figure 11) upon a fixed horizontal spindle 22 located on the rear pillar 3 and projecting rearwardly therefrom parallel to the cam shaft 18.

The spur wheel 21 forms part of a main friction clutch incorporating a further and smaller or intermediate spur wheel 23 rotatably mounted on the spindle 22, this further spur wheel being coaxial with the wheel 21 and meshing with a larger spur wheel 24 fixed upon the rear portion of the cam shaft 18.

The said friction clutch comprises an annular flange 25 fixed coaxially on the rear end of the intermediate spur gear 23 and having an annular friction band 26 on its rear surface, this band being adapted to co-operate with the adjacent front end surface of the spur wheel 21 drivingly to couple this wheel to the intermediate spur wheel 23 when axial pressure is applied to the wheel 21 in order to urge it against the annular friction band 26.

The front end of the intermediate wheel 23 engages against a thrust bearing 27 seated in a housing 28 recessed into the rear surface of the pillar 3 whilst the rear surface of the spur wheel 21 is engaged by a thrust race 29 slidable along the spindle 22 and carried in a collar 30 rotatable about the spindle 22 by means of a handle 31, said collar having a coaxial boss 32 screwed on to the reduced screw threaded rear end 33 of the spindle 22, the said screw thread being a quick thread so that a partial rotation of the collar 30 will be sufficient to effect engagement of the wheel 21 with, or the release of this wheel from, the friction band 26 thereby to establish, or disconnect, the drive from the sprocket 19 to the spindle 18. The collar 32 is retained on the spindle 22 by lock nuts.

On the cam shaft 18 is mounted, between the pillars 2 and 3 and under the bed plate 1, a drum cam 34 which rotates with the shaft and is furnished with a peripheral approximately helical cam track or groove 35. In this track is engaged a roller 36 (see Figures 3 and 5 in particular) mounted on the reduced end 37 of a dependent pin 38 carried on the underside of the main slide 4 and located in a slot 39 extending in a front to back direction and through the bed 1 of the machine, the arrangement being such that, as the shaft 18 rotates, the main slide 4 is traversed on its bed 1 in a direction at right angles to the axis of the cutting wheel spindle 11.

The part, shown in Figure 3, of the cam track 35 of the drum cam 34 serves to give a substantially uniform rate of movement to the said main slide during the cutting strokes of the machine but the part of the cam track shown in Figure 1 serves more quickly to return the main slide to its initial position after a cutting operation has been effected.

This movement imparted to the main slide 4 by the cam 34 should be great enough to enable the machine to be used on any size of sheet which the machine is designed to cut.

On the rear portion of the cam shaft 18 are also fixed two other cams marked respectively 40 and 41 (see particularly Figures 3, 5, 6 and 7), these cams being arranged side by side and being respectively referred to hereinafter as the "work slide indexing cam" and the "cutting wheel advancing cam." These cams are keyed to the shaft 18 so as to rotate therewith and, taking the cutting wheel advancing cam 41 first, it will be seen that this cam operates upon a follower roller 42 on one end of a rocker lever 43 movable in a vertical plane and mounted on a horizontal pivot 44 carried by the rear pillar 3 of the machine, the other end 45 of the said rocker lever engaging the lower end of a vertical push rod 46 mounted for vertical guided movement through the said main slide bed 1 and the horn or arm 16 carrying the cutting wheel head pivot spindle. The upper end of the push rod 46 is adapted to co-operate with the lower end of a vertical screw 47 having a knurled head 48 and mounted in the arm 17 of the said cutting head 14 so that as the said push rod rises, the cutting wheel 6 is depressed towards the work slide 5 by a predetermined amount depending upon the throw of the cutting wheel advancing cam 41, and the setting of the screw 47 which can be advanced or retracted to advance or retard the moment of operation of the push rod 46 upon the cutting wheel head.

A tension spring 49 connected at one end to the arm 17 of the cutting wheel head 14, and at the other end to a fixed pin 50 on the bed 1, serves always to retract the cutting wheel from the work slide, the retracting movement of this spring being limited by co-operating abutments 51 and 52 respectively on the arm 17 and said horn or arm 16.

The knurled head 48 of the screw 47 conveniently carries on its upper surface an annular graduated scale 53 (Figure 2) co-operating with a fixed index pointer 54 on the arm 17 of the head 14 so as to show the relative position of the screw 47 with respect to the pointer.

From the screw threaded hole in the arm 17 in which the screw 47 is located, a slot 55 (see particularly Figure 10) extends radially and a screw 56 passes horizontally through this arm and serves to contract the slot 55 when tightened up, thereby to lock the screw 47 against accidental rotation.

The arrangement of the said cutting wheel advancing and retracting cam 41 is such that the cutting wheel is advanced, preparatory to every cutting stroke of the main slide 4, towards the work slide 5 sufficiently to ensure that the wheel 6 will make the required depth of cut in (usually just through) the sheet of material mounted for cutting on the work slide, the cutting wheel being retracted from the work slide by the spring 49 at the end of each cutting stroke so that the wheel is held clear of the work whilst the main slide 4 (with the work slide 5) makes its quick return movement ready for another cutting operation.

The work slide indexing cam 40 actuates a one-way drive mechanism (generally indicated by the reference 57 and shown particularly in Figures 8 and 9) for periodically advancing or indexing the work slide 5 step-by-step across the main slide 4 in a direction parallel to the axis of the cutting wheel spindle 11 so that successive laterally equally spaced cuts can automatically be made across the workpiece along parallel lines.

The indexing of the work slide 5 is effected by a rotary, but axially immovable, screw 58 extending across and journalled in the main slide 4 (see for example Figures 3 and 5) and operating in a nut 59 carried by the work slide 5 on the underside thereof. The nut 59 has an upstanding spigot 60 engaging in a vertical hole in the centre of the work slide 5 and the nut itself is located in a longitudinal groove 61 in the top of the main slide 4 and parallel to the cutting wheel spindle 11.

The screw 58 is advanced rotationally in equiangular steps, one step at a time, during the successive return strokes of the main slide after the cutting wheel 6 has been retracted from the work slide, said step-by-step angular rotation of the screw 58 being effected by the said one-way drive mechanism 57 which may (as shown, for example, in Figures 1, 4, 8 and 9 of the drawings) be in the form of a free wheel device having a lever arm 62 operated from the said work slide indexing cam 40 via a push rod 63, the upper end of which engages a hardened tappet 64 clamped by a screw 65 in the forked end of the lever 62 whilst the other end of the push rod 63 co-operates with the outer end 66 (Figures 4 and 6) of a rocker 67 similar to the rocker lever 43 and mounted upon the same spindle 44, the rocker lever 67 having at its inner end a follower roller 68 for co-operation with the work slide indexing cam 40 which is peripherally mainly cylindrical but has a single radial protuberance 69 adapted to depress the follower 68 to a substantial extent once for every revolution of a shaft 18. Every time the follower roller 68 is depressed the push rod 63 is raised and consequently the arm 62 of the free wheel device is raised to a corresponding extent.

The said free wheel device comprises an outer cylinder or ring 70 rotatable about a cylindrical inner body or core 71 (see Figures 8 and 9 in particular) mounted coaxially upon one end of the work slide indexing screw 58 so as to be free to rotate, whilst being restrained against axial movement, thereon. The arm 62 extends rigidly and approximately tangentially from the outer cylinder 70; consequently this outer cylinder oscillates with the arm 62 which is, after being raised by the push rod 63, returned to its original position by means of a tension spring 72 anchored at one end to a short arm 73 (Figures 1 and 8) on the said outer cylinder 70, and at the other end to a fixed dependent finger 74 on the work slide 5.

The cylindrical body or core 71 of the free wheel device 57 is furnished peripherally with a plurality of equi-angularly spaced recesses 74 each containing a ball or roller 75 and deeper at one end than at the other, the bases of said recesses constituting inclined ramps and spring plunger means 76 being provided in each recess 74 to urge the ball in such recess towards the shallower end of the latter so as to tend to bind between the inner surface of the surrounding outer cylinder 70 of the free wheel device and the base of its recess 74, this arrangement being so designed that as the arm 62 is raised by the push rod 63, the outer cylinder 70 rides freely over the balls or rollers 75 without moving the body 71 of the device and at the same time places additional tension upon the spring 72, whilst when the arm 62 is allowed by the push rod 63 to return to its original position under the action of the spring 72, the balls or rollers 75 are trapped between the bases of the recesses 74 of the body 71 and the outer cylinder 70 whereby the body 71 is caused to rotate with the outer cylinder 70, the extent of the angular movement of this body being limited by means of an adjustable screw 77 (Figure 1) carried on the work slide 5. It will be seen that the screw 77 acts as a stop adapted to engage the under side of the arm 62 and determines the extent of the return movement of this arm and consequently, as will hereinafter become apparent the extent of rotation of the screw 58. The screw 77 also supports the arm 62 during the period that the tappet 64 is not in contact with the push rod 63 as the work slide 5 reciprocates with the main slide 4.

The push rod 63 is guided for vertical movement at its lower part by a bracket 78 in which the push rod 46 is also guided carried by the pillar 3 and at its upper end the push rod is guided in a lateral flange or extension 79 of the horn or arm 16. Moreover, the push rods 63 and 46 are urged downwardly on to their rocker levers 66 and 45 respectively by compression springs 80 and 81 arranged around the push rods and engaging at their upper ends respectively against the underside of the said extension or flange 79 and the bed 1, and at their lower ends against collars 82 and 83 respectively on the push rods 63 and 46 and adjustable therealong to vary the effect of the springs 80 and 81.

The body 71 of the free wheel device 57 is not fixed directly on to the screw 58 since it is desirable that this should be operable independently and manually by a hand wheel 84 fixed on that end thereof opposite to the one at which the free wheel device 57 is located; consequently the automatic step-by-step rotation of the screw 58 from the body 71 of the device 57 is achieved through a friction clutch comprising an annular friction plate 85 (Figure 9) arranged around an outward fixed extension 86 of the screw 58 and trapped between the outer end of the body 71 of the free wheel device 57 and the inner end flange 87 of a clutch sleeve 88 splined at 89 upon the extension 86 so as to rotate with the latter whilst being slidable axially thereon.

The clutch sleeve 88 is pressed against the annular friction plate 85 by a compression spring 90 arranged around the sleeve 88 and retained thereupon by an end plate 91 secured upon the reduced screw threaded outer end of the extension 86. Thus the screw 58 is driven frictionally through the clutch plate 85 and clutch sleeve 88 when the body 71 of the free wheel device is rotated by the action of the tension spring 72 but the screw is still free to be rotated manually by the hand wheel 84 in either direction, the clutch sleeve 88 slipping in this case on the clutch plate 85.

From what has been said above it will be understood that each time the arm 62 of the free wheel device 57 is operated by the spring 72, the work slide adjusting screw 58 is advanced through a predetermined angular distance and thereby effects a predetermined linear adjustment or indexing of this work slide 5, the extent of this linear adjustment being varied, if desired, by means of the said adjusting screw 77.

The cutting wheel spindle 11 is mounted (see Figure 10) coaxially in a tubular housing 92 which is entirely removable from the arm 13 of the wheel head 14 by which it is carried and in which it is clamped, this tubular body being furnished at its two ends respectively with cover caps 93 and 94 and anti-friction ball or roller races 95 and 96, the race 96 at the end of the spindle remote from the cutting wheel preferably being spring loaded by a suitable compression spring 97 within the said tubular housing 92 to take up any end play which may arise in use between the spindle and its bearings.

The cutting wheel spindle 11 is conveniently driven by a belt 98 passing around a pulley 99 keyed on to the end of the spindle 11 remote from the cutting wheel and also around a twin grooved pulley wheel 100 mounted for free rotation on a co-linear extension 101 of the cutting wheel head pivot spindle 15, this pulley in turn being driven by a belt 102 from a pulley driven from a suitable source e. g. the motor driving the hereinbefore mentioned sprocket 19, or on a separate motor, as desired.

Hand means e. g. hand lever such as indicated in dotted lines at 103 (Figure 3) may be provided for rotating the said driven shaft 18 during the initial setting of the main slide 4 and for moving this when the driving motor is not operating.

Suitable guards will preferably be provided on the machine to safeguard operatives during its working.

The main slide 4 and the work slide 5 may respectively operate on guides of dove-tail cross section in the usual manner adapted in adjustable slides in lathes and other machine tools and adjustable packing strips may be provided to take up wear or play between such parts.

A suitable electric switching arrangement may be provided automatically to stop the machine on the completion of the cutting of a sheet along any of the said series of parallel lines, e. g. at the completion of the full indexing movement of the work slide; such arrangement may include a micro-switch 104 carried on the inside surface of the upstanding arm of a cranked bracket 105 adjustably fixed to and extending laterally from one side of the bed 1 (see Figures 1, 2 and 3), the switch being operated by a round headed button 106 (See Figure 2) which may be interchangeable for others of any suitable axial length according to the position at which the work slide is to be stopped and which button is located at the front left hand corner of the work slide. By making the switch 104 adjustable and the button 106 interchangeable, it is possible to vary the moment of operation of the switch.

In using the machine described above, a sheet 107 of germanium or other material which is to be cut is adhered to a sheet 108 of glass, mica or other suitable material secured to a metal or other suitable backing plate 109 mounted on spaced upstanding pins 110 on the top of the work slide 5. The germanium or like sheet 107 is cut successively along a series of parallel lines as the main slide 4 is successively reciprocated by the drum cam 34 and the work slide is successively advanced step-by-step across the main slide, the cutting wheel 7 being brought automatically into contact with the sheet 107 at the beginning of each cutting stroke and automatically raised at the end of such stroke, these operations continuing until the machine is stopped by the actuation of the switch 104. Thus the sheet 107 will be cut into a number of similar parallel strips whereafter the backing plate 109 with sheet 107 is lifted from the work slide 5 and turned through 90° and re-mounted on the work slide in order that it may be cut again along a series of lines at right angles to those along which it was first cut, the sheet 107 thus being severed into a plurality of identical rectangular pieces which, if the thickness of the original germanium is the same as the distance between the cutting lines, will be cubes. Of course instead of cutting the sheet 107 into rectangular pieces or squares it could be cut into other forms e. g. thin slices in which case the work piece may not require to be cut in two directions transverse to one another.

The said horn or arm 16 carrying the cutting wheel head may be adjustable in height to enable the machine to be adapted to suit different work-piece thicknesses, where the height of the said horn or arm is adjusted corresponding adjustments will require to be made in the effective lengths of the said push rods 46 and 63, or these would have to be changed.

I claim:

1. A machine for cutting sheets of hard material into smaller pieces, such machine comprising: a work slide for supporting a sheet to be cut; a cutting wheel adjacent to said work slide; a main slide carrying said work slide and reciprocable in the direction of the plane of said cutting wheel; a drum located with its axis parallel with the direction of reciprocation of said main slide; a peripheral cam track on said drum; a follower on said main slide co-operating with said cam track to reciprocate said main slide upon rotation of said drum; cam means for cyclically advancing said cutting wheel towards said work slide at the commencement of alternate strokes of said main slide and for withdrawing said cutting wheel at the termination of each such stroke; and means for indexing said work slide relatively to said main slide in a direction parallel with the axis of said cutting wheel and whilst the latter is withdrawn from said work slide.

2. The machine of claim 1, in which said cam track is disposed to effect a slow stroke of said main slide whilst said cutting wheel is advanced towards the said work slide, and a quick return stroke.

3. The machine of claim 2, including a cutting head comprising a pivoted lever, and a spindle journalled on said lever and carrying said cutting wheel, said cam means cyclically oscillating said lever about its pivot to advance said cutting wheel towards said work slide.

4. The machine of claim 3, including spring means for withdrawing said cutting wheel from said work slide.

5. The machine of claim 1, in which said indexing means comprise screw and nut mechanism co-acting with said main slide and said work slide, and means for operating said mechanism once for each alternate stroke of said main slide.

6. A machine for cutting sheets of hard material into smaller pieces, such machine comprising: a work slide for supporting a sheet to be cut; a cutting head; a cutting wheel carried by said cutting head; a main slide carrying said work slide; means for reciprocating said main slide in the direction of the plane of said cutting wheel and comprising a cam shaft and a drum carried thereby, a peripheral cam track on said drum, and a follower co-operating with said cam track to reciprocate said main slide upon rotation of said drum; cam means for cyclically advancing said cutting head towards said work slide at the commencement of alternate strokes of said main slide and for withdrawing said cutting wheel at the termination of each such stroke; and means for indexing said work slide relatively to said main slide in a direction parallel with the axis of said cutting wheel and whilst the latter is withdrawn from said work slide.

7. The machine of claim 6, including a cutting head-advancing cam on said cam shaft, and a follower co-operating with such cam and effective to advance the cutting head towards said work slide at the commencement of said alternate strokes of said main slide.

8. The machine of claim 7, in which said indexing means comprise an indexing cam on said cam shaft, a follower co-operating with said cam, a one-way-drive mechanism actuated by said follower, and a screw and nut mechanism driven by said one-way-drive mechanism and co-acting with said main slide and said work slide.

9. The machine of claim 8, in which said one-way-drive mechanism comprises a friction clutch capable of slipping to enable said screw and nut mechanism to be operated independently of said indexing cam.

10. The machine of claim 9, including a power source and change-speed gearing connecting such power source to said cam shaft.

11. The machine of claim 10, including a friction clutch in the drive between said power source and said cam shaft, said clutch being operable to engage and disengage the said drive.

12. The machine of claim 6, in which said cutting head comprises a lever pivoted between its ends and a spindle journalled near one end of said lever, said spindle carrying said cutting wheel and oscillation of said lever about its pivot being effective to advance and withdraw the cutting wheel relatively to said work slide.

13. The machine of claim 12, including a housing in which said spindle is journalled, said housing being detachably carried by said lever.

References Cited in the file of this patent

UNITED STATES PATENTS

| Number | Name | Date |
|---|---|---|
| 1,104,988 | Hanson | July 28, 1914 |
| 1,219,038 | Philippi | Mar. 13, 1917 |
| 1,515,039 | Hanson | Nov. 11, 1924 |
| 1,583,797 | Rehm | May 11, 1926 |
| 1,947,466 | Edgar | Feb. 20, 1934 |
| 1,947,662 | Robinson | Feb. 20, 1934 |
| 2,390,978 | Woodbury | Dec. 11, 1945 |
| 2,477,733 | Garside | Aug. 2, 1949 |
| 2,562,327 | Moore | July 31, 1951 |
| 2,571,556 | Folkerth | Oct. 16, 1951 |